United States Patent [19]
Novakovi

[11] Patent Number: 5,217,043
[45] Date of Patent: Jun. 8, 1993

[54] CONTROL VALVE

[76] Inventor: Mili Novakovi, KOD(c/o) Mrs. Mare Vučak, UL.Trg Pobede Broj 16, 11080 Zemun, Yugoslavia

[21] Appl. No.: 839,560

[22] Filed: Feb. 24, 1992

Related U.S. Application Data

[63] Continuation of Ser. No. 511,256, Apr. 19, 1990, abandoned.

[51] Int. Cl.[5] .................... F16K 17/02; F16K 31/42
[52] U.S. Cl. .................... 137/460; 251/331; 251/282; 251/335.3; 251/45
[58] Field of Search .................. 251/335.3, 282, 331, 251/45; 137/460

[56] References Cited

U.S. PATENT DOCUMENTS

| | | | |
|---|---|---|---|
| 2,331,503 | 10/1943 | Ray | 251/335.3 X |
| 2,388,696 | 11/1945 | Lacart et al. | 251/282 X |
| 3,214,134 | 10/1965 | Noakes | 251/282 |
| 3,797,803 | 3/1974 | Goto et al. | 251/282 X |

FOREIGN PATENT DOCUMENTS

| | | |
|---|---|---|
| 3315972 | 11/1984 | Fed. Rep. of Germany . |
| 1323932 | 9/1970 | United Kingdom . |

Primary Examiner—Arnold Rosenthal
Attorney, Agent, or Firm—Bull, Housser & Tupper

[57] ABSTRACT

The valve has a casing with inlet and outlet ports, and a valve opening bordered by a valve seat communicating the ports. A flexible diaphragm defines a control chamber and a pressure chamber on opposite sides thereof and moves between an open position clear of the seat, and a closed position against the seat. The valve seat is within the pressure chamber, and the diaphragm is normally urged closed. A flexible bellows extends between and is sealed to the diaphragm and the casing on a side of the diaphragm remote from the seat. The bellows provides a bellows chamber isolated from the control chamber to enclose an effective area of the diaphragm generally equal to the valve opening of the valve seat. The diaphragm has an orifice providing limited communication between the control and pressure chambers and having a size sufficient to reduce fluid flow between the chambers to reduce diaphragm speed and thus chances of hydraulic hammer. The casing has by-pass channels communicating one of the said chambers with the outlet port when the diaphragm is held against the valve seat, optionally the bypass channels can be valved. Another embodiment of the valve for gas applications eliminates the diaphragm, but the bellows similarly isolates a portion of the valve member from inlet pressure, and has an effective bellows area equal to valve seat nominal opening area.

13 Claims, 9 Drawing Sheets

CONTROL VALVE

CROSS-REFERENCES TO RELATED APPLICATIONS

This is a continuation of my co-pending application Ser. No. 07/511,256 filed 19 Apr. 1990, now abandoned.

FIELD OF THE INVENTION

This invention relates to fluid control valves, in particular to safety valves which react automatically to insufficient pressure. According to the IPC this invention bears the denotation F16K 17/02.

TECHNICAL PROBLEM

It is known to provide a control valve which protects pipe installations from uncontrolled fluid outflow which can occur with pipe breakage. Problems can arise when re-supplying fluid after eliminating the cause of flow stopping e.g. after repairing a break in the pipe. When water is in the supply pipes, it is necessary to limit the maximum required capacity and also to prevent scale sedimentation with the valve, as well as to reduce or completely avoid hydraulic hammer. In some applications the valve can react as a vacuum valve.

PRIOR ART

To the inventor's knowledge, the most up-to-date solution in the field of safety valves is his own international patent application PCT/CH88/0048 (WO88/06694). In this device, the objective is the protection of pipe installations through which the fluid is transported to the users, and where the supply can be interrupted frequently due to various reasons such as: pipe cracking, installation survey, fluid delivery pressure reduction, etc. The users use the fluid by opening the valves or taps. If there is no fluid in the installation due to the reasons mentioned above, a user can forget to close the valve or tap. When the fluid is resupplied again into installation, if the valves and taps are open, the fluid will flow out into the building, and even if it is only water, it can cause considerable damage. If the fluids are corrosive, e.g. gases or acids, the consequences could be catastrophic damages.

A protection valve, according to the above-mentioned patent publication, automatically shuts off the fluid flow due to pressure drop in valve outlet opening. Although the valve has solved some problems, testing has showed a number of defects. After a few days a piston ring of the valve prevents functioning, because of scale sedimentation on the inside casing wall which prevents the piston from moving. The ring gap regulation presents problems, because it is difficult to obtain a sufficiently small ring gap without initiating hydraulic hammer. A small ring gap can restrict the piston against movement. Another problem is valve instability which results from differential area of effective surfaces of the piston and valve seat. Valve instability is partly solved within the device wherein an effective bellows area is 70% less than a valve seat area. However, some system instability remains, due to regulation characteristics. Valve regulation is controlled by a screw acting on a spring, and is directly related to the inlet pressure at the valve entrance.

SUMMARY OF THE INVENTION

The control valve according to the invention has several embodiments which have advantages over prior art known to the inventor as below. The present valve automatically prevents unintentional fluid flow from a pipe in the case of pipe failure and can also control flow in case of excessive consumption. One embodiment of the valve can be used as a vacuum valve to automatically prevent return of polluted water due to suction which can occur in some installations when water supply has been cut off. The valve can automatically open after repair of a damaged pipe and thus continue the supply of liquid. Scale deposited in the valve by liquid in the pipe has minimum effect on the functioning of the valve. Effects of hydraulic hammer are reduced considerably because the valve is relatively stable. The valve is easy to install into existing pipe installations, is mechanically simple, reliable and has a relatively long life. Inlet pressure fluctuations in the fluid network do not affect operation of the present invention. Also, the valve can also be adjusted to automatically shut-off when outlet fluid pressure falls below a minimum limit. Remote opening and closing is possible with some embodiments, and one embodiment is limited to use with gases only. Important components of the valve can be installed into existing valve casings of known producers of prior art valves.

One embodiment of a control valve comprises casing means, a flexible diaphragm, a resilient means and a flexible bellows. The casing means has an inlet port, an outlet port and a valve opening having a nominal opening area bordered by a valve seat and being disposed between the inlet and outer ports to provide communication therebetween. The flexible diaphragm is secured to the casing means to define, together with the casing means, a control chamber and a pressure chamber on opposite sides of a diaphragm. The diaphragm is movable between an open position clear of the valve seat and a closed position against the valve seat. The valve seat is within the pressure chamber. The resilient means urges the diaphragm to the closed position thereof. The flexible bellows extends between the diaphragm and the casing means and is located within the control chamber on a side of the diaphragm remote from the valve seat. The bellows is sealed at opposite ends thereof with respect to the diaphragm and the casing means to provide a bellows chamber isolated from the control chamber. The bellows chamber has an effective bellows area defined by a closed envelope passing approximately midway between inner and outer convolutions of the bellows and enclosing an effective area of the diaphragm generally equal to size of the nominal opening area bordered by the valve seat, so as to isolate a portion of the diaphragm enclosed by the bellows from pressure within the control chamber.

Preferably, the diaphragm has an orifice to provide limited communication between the control chamber and the pressure chamber. The orifice has a size sufficient to reduce fluid flow between the control chamber and the pressure chamber so as to reduce speed of the diaphragm when opening or closing to reduce chances of hydraulic hammer. Also, the casing means has channel means for communicating one of said chambers on one side of the diaphragm with the outlet port when the diaphragm is held against the valve seat to close the valve.

Preferably, the diaphragm orifice is positioned to be clear of obstructions so as to provide generally equally restricted flow therethrough in either direction between the control chamber and the pressure chamber. Preferably, the diaphragm also has a shape to accommodate movement of the diaphragm connector between the open and closed positions of the valve with essentially negligible deformation of the orifice, so as to have a negligible effect on flow through the orifice in any position of the diaphragm connector.

In another embodiment for controlling gas flow only, the diaphragm is eliminated and the bellows is mounted on a first side of a valve member remote from the valve seat. The bellows isolates the first side of the valve member from inlet pressure and has a similar effective bellows area.

A detailed disclosure following, related to drawings, describes several embodiments of the invention which are capable of structure other than that particularly described and illustrated.

DETAILED DISCLOSURE

Figure 1:
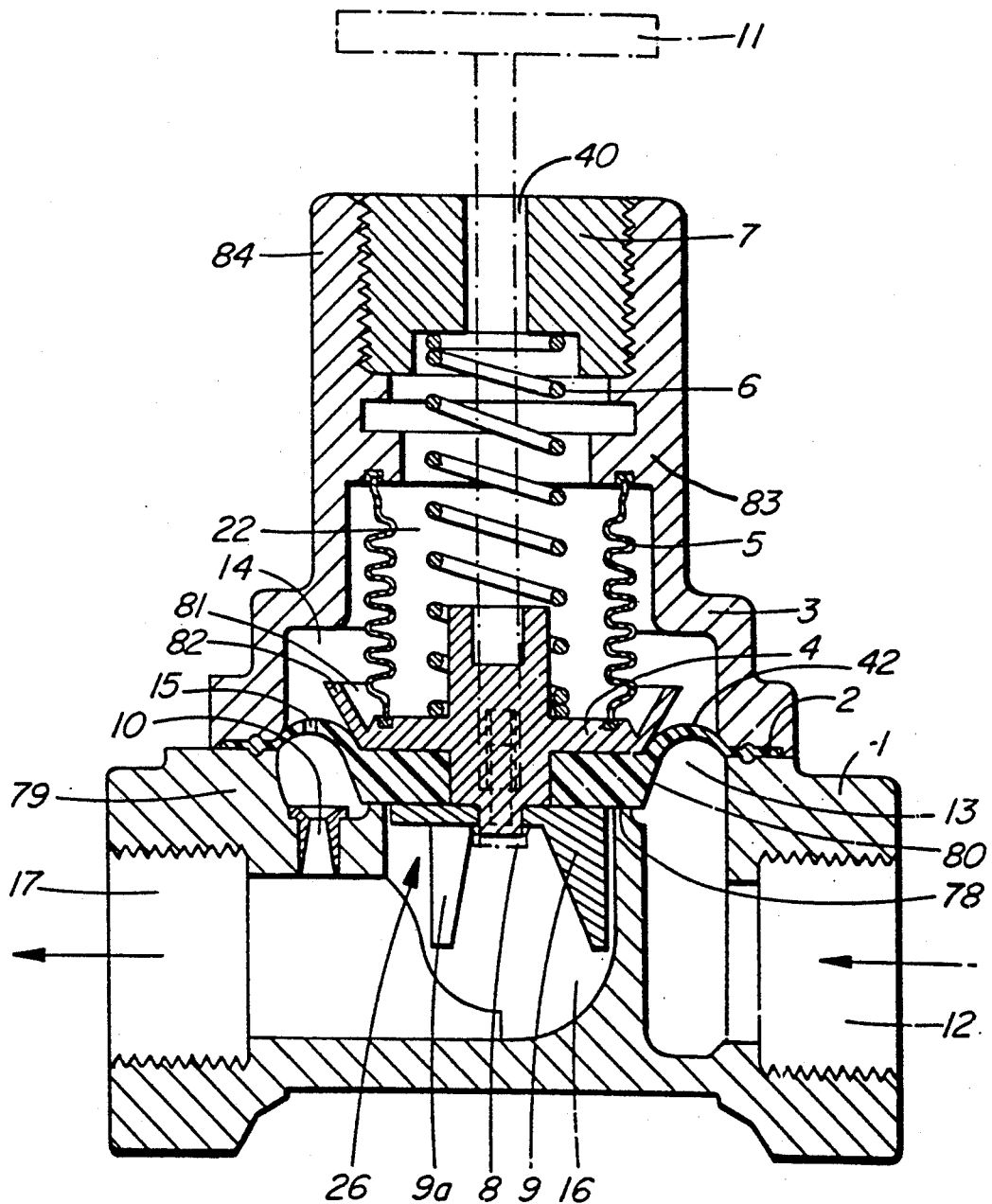
FIG. 1 is a simplified vertical section of a first embodiment of a universal control valve according to the invention, the valve being shown closed and with a self-rinsing nozzle.
Figure 2:
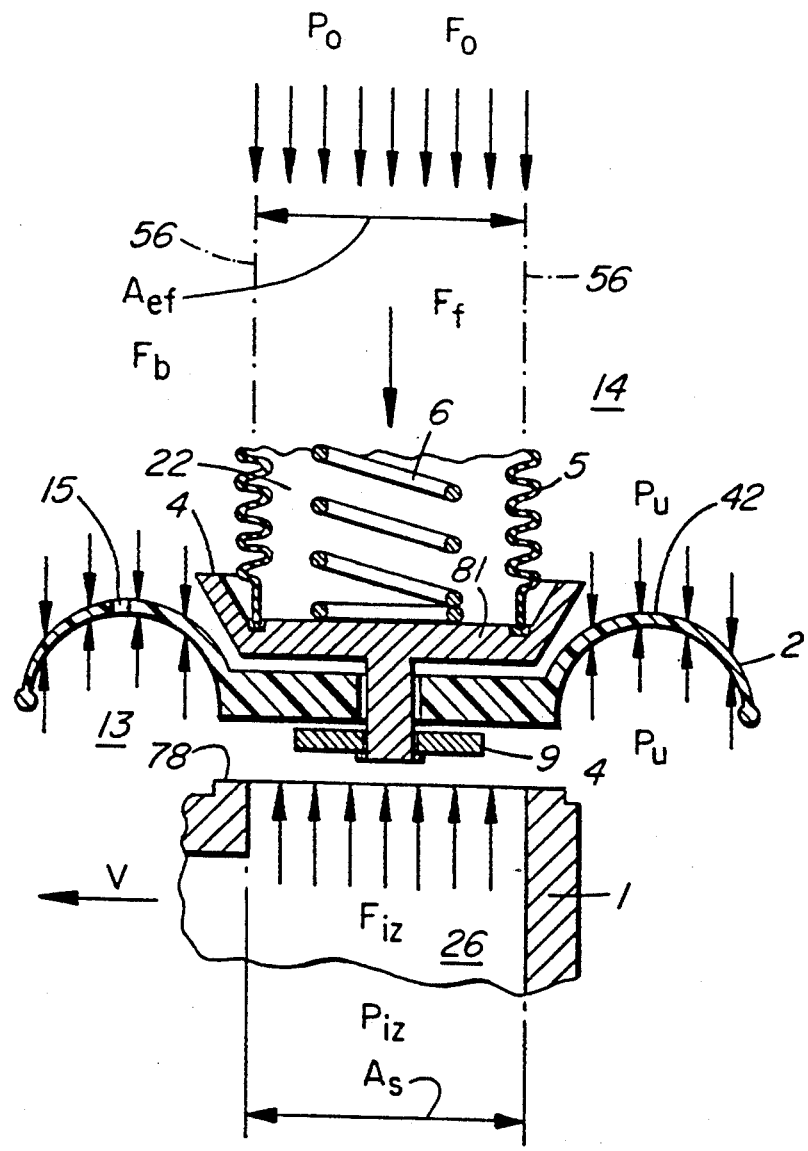
FIG. 2 is a simplified diagram representing forces and pressures on opposite sides of a diaphragm when the valve is open, the diagram showing effective areas of bellows and a valve seat for cooperating with the diaphragm.

FIG. 1 with References to FIG. 2

The term "fluid" herein refers to liquids and/or gases, particularly with respect to the description of operation of the valve with reference to FIG. 2.

A first embodiment of a universal control valve according to the invention is for use with a liquid and has a lower casing 1, an upper casing 3 and a flexible diaphragm 2 fixed therebetween. The lower casing 1 has an upper wall 79 with a main valve opening 26 having a nominal area $A_s$ (FIG. 2) bordered by a valve seat 78. The upper wall 79 has a self-rinsing nozzle or first channel means 10 located above an outlet port 17, which is disposed on an opposite side of the valve seat from an inlet port 12. Thus, the casings 1 and 3 provide casing means having the inlet port 12, the outlet port 17 and the valve opening 26 bordered by the valve seat 78 and disposed between the inlet and outlet ports to provide communication therebetween. An equalizing chamber 16 is located directly beneath the valve seat 78 and communicates with the outlet port 17. The self-rinsing nozzle 10 is seen to provide communication between the pressure chamber 13 and the equalizing chamber 16 and thus provides a by-pass channel means for the opening 26 when the valve is closed as shown in FIG. 1.

The diaphragm 2 has a thickened central portion 80 disposed between an upper valve plate 4 and a lower diaphragm guide 9. A screw 8, broken outline, secures the diaphragm guide 9 to the valve plate 4 to form a diaphragm connector. The guide 9 is fitted with leading or guiding elements 9A which are axially extending projections spaced peripherally around the diaphragm to cooperate with a sidewall of the valve opening 26 to ensure accurate seating of the central portion 80 of the diaphragm upon the valve seat 78. The diaphragm 2 is secured to the casing means to define, together with the casing means, a control chamber 14 and a pressure chamber 13 on opposite sides of the diaphragm. The diaphragm connector is mounted on the diaphragm for movement therewith between an open position clear of the seat 78 and a closed position against the seat. It can be seen that the seat 78 is disposed within the pressure chamber 13 and the control valve is shown in the closed position with the diaphragm portion 80 urged against the seat 78.

A stud 7 with a central bore 40 is screwed into an upper part 84 of the upper casing 3. A compression coil spring 6 has one end against the stud 7 and an opposite end forced against the plate 4. The spring 6 serves as a resilient means for urging the diaphragm to the closed position thereof as shown. A pulling rod 11 is connected to an upper portion of the valve plate 4 and is shown in broken outline as it is optional to the invention as will be described. The pulling rod 11 is encircled by the spring 6 and passes freely through the bore 40 of the stud 7. The rod 11 has an inner end cooperating with the diaphragm connector, that is the plate 4 and holder 9, and an outer end having a handle means for gripping.

On an upper side of the plate 4, a plate-like chamber 81 is formed with an inside diameter approximately equal to the nominal opening 26 diameter. This chamber 81 is bordered by a rim or limiter 82 which is adapted to contact the casing 3 when the valve is fully open. A bellows 5 is located in the chamber 14 and has a lower end hermetically sealed and fixed to the inside of the chamber 81 of the plate 4, and an opposite upper end hermetically sealed and fixed to an inwardly extending annular part 83 of the upper casing 3. The bellows 5 is flexible and extends between the diaphragm connector, that is the plate 4 and holder 9, and the casing means within the upper or control chamber 14 on a side of the diaphragm 2 remote from the seat 78. It can be seen that the bellows is sealed at opposite ends thereof with respect to the diaphragm and the casing means to provide a bellows chamber 22 isolated from the control chamber 14 and enclosing an effective bellows area $A_{cf}$ (FIG. 2) of the diaphragm. The area $A_{cf}$ is equal to area of the chamber 81 and is defined by a closed envelope, shown as two spaced apart, parallel broken lines 56 in FIG. 2, passing approximately midway between inner and outer convolutions of the bellows. As the bellows encloses the area of the plate-like chamber 81, the bellows also encloses an effective area of the diaphragm generally equal to size of the opening 26, bordered by the seat i.e. the nominal opening area $A_s$, but on a side of the diaphragm opposite to the seat. Thus, the bellows isolates an upper central portion of the diaphragm 2 from pressure within the control chamber 14. It can be seen that the control chamber 14 is formed between the diaphragm 2, the bellows 5 and the upper casing 3, and the pressure chamber is formed between the lower casing 1 and the diaphragm 2.

The diaphragm 2 has an orifice 15 located above the self-rinsing nozzle 10, the orifice 15 being relatively small when compared With the nozzle 10 and providing very limited communication between the control chamber 14 and the pressure chamber 13 as will be described. The diaphragm 2 also has an annular convolution 42 extending upwardly from an outer periphery and central portion thereof to provide fullness to accommodate travel of the diaphragm. The orifice 15 is located in the convolution 42 to be clear of other structures and the size of the orifice is essentially unaffected by movement of the diaphragm.

OPERATION

FIGS. 1 and 2

FIG. 2 is a diagram particularly showing orifices associated with operation of liquid control valves, as shown in FIGS. 1, and 3 through 7. However, aspects relating to the bellows and valve seat also apply to the gas control valve of FIG. 8 and hence the term "fluid" is used in the following description.

The diaphragm 2 is forced against the valve seat 78 by pressure from the spring 6, which pressure is adjustable by rotating the stud 7 which varies spacing between upper and lower ends of the spring. Assuming there is no fluid pressure within the inlet and outlet pipe, the diaphragm is held against the seat 78 mainly by force from the spring 6, and some compression force from the bellows 5. When the inlet port 12 and the pressure chamber 13 are exposed to fluid pressure, a relatively small volume of fluid flow will pass into the outlet port from the pressure chamber through the self-rinsing nozzle 10. A small amount of fluid within the chamber 13 also passes through the orifice 15 in the diaphragm 2 into the control chamber 14. When the valve is completely filled, the fluid within the pressure chamber 13 exerts an upward force on the diaphragm 2, and fluid in the chamber 14 exerts a downwards force on the diaphragm 2. When the pressure chamber 13 and control chamber 14 are completely filled, fluid pressures on each side of outer annular portions of the diaphragm 2 are equal, and there is no additional differential force acting on the plate 4.

FIG. 2 represents forces on the diaphragm in this condition which can be expressed as below:

$$F_{rez} = F_{iz} - (F_f + F_b + F_o) = 0$$

Where:
$F_{rez}$ is the resultant force on diaphragm,
$F_{iz}$ is the outlet pressure force,
$F_f$ is the spring resilience force,
$F_b$ is bellows resilience force, and
$F_o$ is the atmospheric pressure force within the bellows chamber.

Also, in FIG. 2:

$A_{cf}$ is the effective bellows area or thrust surface area of the plate-like chamber 81,
$A_s$ is nominal opening area 26 defined by valve seat 78,
$f(P_u)$ is the intake pressure function.

The bellows chamber 22 is subjected to atmospheric pressure $P_o$ which is admitted through an upper portion of the bellows through the bore 40 in the stud 7 which receives the optional pulling rod 11. The bellows resilience force $F_b$ results from compressible resilience in the bellows 5 which acts in concert with spring force $F_f$ and is considered in the above equation.

In normal operation when the control valve is open, the outer annular portion of the lower surface of the diaphragm 2 is exposed to intake pressure $P_u$, as seen in FIG. 2. This intake pressure, via the orifice 15, enters the control chamber 14 and also acts on the outer annular portion of the upper surface of the diaphragm 2. Thus, the outer annular portion of the diaphragm 2 is always balanced by equal pressures $P_u$ on opposite sides thereof. When fluid passes the valve seat 78 to flow towards the valve outlet port 17, its pressure drops somewhat so that the equalizing chamber 16 is at a lower outlet pressure $F_{iz}$ which acts upwardly on a lower surface of the portion 80 of diaphragm. Likewise an upper surface of the inner portion of the diaphragm is isolated from the pressure within the control chamber 14 by the bellows 5. The space 22 in the bellows is at atmospheric pressure $P_o$, which combines with forces $F_f$ and $F_b$ from resilience of the spring and the bellows respectively, but this combination of forces is insufficient to overcome the upwards force acting on the centre portion of the diaphragm due to the outlet pressure force $F_{iz}$, and thus the control valve remains open. When valve is open, the diaphragm attains an equilibrium position dependent upon a balance between upwards and downwards forces.

However, if a break occurs in the pipe downstream from the outlet port 17, the outlet pressure $P_{iz}$ drops even further, and thus upwards force $F_{iz}$ on the lower surface of the diaphragm portion 80 due to the outlet pressure in the equalizing chamber 16 is reduced. As always, pressures acting on both sides of the outer annular portions of the diaphragm are balanced, but there is a net downward force on the diaphragm due to compression of the spring 6 and the bellows 5. However, the diaphragm 2 is restricted from moving downwardly due to fluid in the control chamber 14, which resistance can only be overcome by admitting fluid into the chamber 14 through the orifice 15. As the orifice 15 is relatively small, fluid flow therethrough is restricted, and is dependent on fluid pressures across the diaphragm. This restriction limits volume of fluid flow communication between the pressure chamber 13 and the control chamber 14, and thus controls downward movement of the diaphragm, which is essentially constant for most of the diaphragm travel and is relatively slow and results in slow closure of the valve. Clearly, as spring force gradually decreases due to extension of the spring and pressure differences across the diaphragm decrease, rate of flow through the orifice has decreased just before closure, which produces a gentle contact between the seat and diaphragm.

In summary, the diaphragm 2 has the orifice 15 to provide limited communication between the control chamber 14 and the pressure chamber 13. The orifice 15 is of a size sufficient to reduce fluid flow into the control chamber 14 when the outlet pressure in the outlet port 17 and the equalizing chamber 16 drops. This reduces speed of closing of the diaphragm which is sufficiently slow to reduce the chances of hydraulic hammer and also assist in stabilizing the valve action. Thus, the diaphragm 2 slowly moves to the closed position essentially under the action of the spring force and the bellows force. It can be seen that selection of the spring force and bellows force, and in particular the size of the orifice 15 in the diaphragm 2, enables a very accurate control of diaphragm closing speed. Thus, variations in the inlet pressure do not effect flow through the valve or closing speed or operation of the valve.

When the valve is closed by the diaphragm, the fluid from the inlet port 12 can by-pass the closed opening 26 by flowing from the chamber 13 through the self-rinsing nozzle 10 into the chamber 16, out through the outlet port 17 and downstream through the pipe installation to downstream valves and taps. If a downstream valve or tap had been left open prior to the break in fluid flow, the fluid will now flow out in a relatively insignificant amount controlled by size of the self-rinsing nozzle 10. This insignificant amount should attract attention of an operator who would then close the downstream valve or tap to reduce further flow and reduce any other damage. It can be seen that the self-rinsing nozzle 10 serves as a first by-pass channel means disposed so as to provide communication between the pressure chamber 13 and the outlet port 17 when the diaphragm 2 is held against the seat to close the control valve. Thus the nozzle 10 provides a by-pass for the closed valve. When the diaphragm 2 is held in its lower or closed position against the seat, maximum pressure in the inlet port is inlet pressure, while atmospheric pressure dominates in the bellows chamber 22 and in the equalizing chamber 16.

When the downstream valve or tap is closed by the operator to prevent further fluid out flow, the pipes downstream from the valve gradually fill with fluid due to a steady flow through the nozzle 10. Eventually the pressure in the equalizing chamber 16 increases due to flow through the self rinsing nozzle 10 and eventually equalizes the inlet pressure, and thus pressure in the chamber 13. Eventually, the upwards force in the equalizing chamber 16 acting on the diaphragm is greater than the combined downwards forces from the resilient forces from the spring 6 and the bellows 5. Thus the downward acting forces are overcome and the plate 4 moves upwardly off the seat, thus opening the valve and enabling fluid to flow from the inlet port through opening 26 enclosed by the valve seat into the outlet port. Upwards movement of the valve is also controlled by flow through the orifice 15, which flow now passes from the control chamber 14 to the chamber 13 as the valve lifts. Again, this is relatively slow and occurs without hydraulic hammer. Slow operation of the valve, increases valve stability during opening also. It can be seen that the size of the orifice 15 is critical for controlling both closing speed and opening speed of the valve, and thus minimizing hydraulic hammer.

Use of the valve as above is particularly applicable for inert liquids, such as water supply systems, where supply failure is not uncommon due to supply reductions or cut-offs. Also, the valve can be used in unstable pipe installations, i.e. in unstable soil or overburden conditions which can cause pipe fracture. When the fluid supply is resumed and downstream taps etc. are closed, the outlet pipe automatically fills up due to flow through the nozzle 10 which effectively by-passes the closed valve seat. Thus, the valve can automatically open when taps or valves downstream from the valve have been closed, or pipe fractures repaired, permitting the automatic re-initiation of flow through the system without manual intervention at the valve. Loss of pressure in the outlet acts to close the valve automatically and thus flow is stopped automatically, also without intervention and hydraulic hammer. The orifice 15 thus provides communication across the diaphragm for both opening and closing the valve at a controlled relatively slow rate. It can be seen that the orifice 15 serves to slow the rate of travel of the diaphragm as a result of pressure imbalances across the diaphragm 2. The orifice 15 has a size which is sufficiently small to permit a measure of flow therethrough at a rate commensurate with the size of the valve and the speed of opening or closing as required. For either valve opening or closing movement, the movement is sufficiently slow to prevent hydraulic hammer, but is sufficiently fast to serve the intended purpose. The control valve will tend to open at an outlet pressure that is very close to the outlet pressure at the time the control valve closes, which is independent of variations in normal working inlet pressure.

It is added that the optional pulling rod 11 can be used to move the diaphragm manually off the seat 78 to open the control valve to initiate flow through the valve without waiting for pressure to normally build up in the equalizing chamber 16 by the relatively slow flow through the nozzle 10. Clearly, if there is a relatively long length of pipe from the outlet port 17 to the tap, it would take a long time for that length of pipe to fill up with the relatively small flow of liquid passing through the nozzle 10. The advantage of the pulling rod 11 is that the control valve can be opened initially by manually pulling the rod 11 upwardly, which accelerates the filling of the pipe, thus permitting a faster return to normal open operation of the valve.

It can be seen that the orifice 15 in the diaphragm is positioned to be clear of obstructions so as to provide generally equally restricted flow therethrough in either direction between the control chamber and the pressure chamber. Furthermore, it can be seen that the annular convolution 42 of the diaphragm provides a shape to accommodate movement of the diaphragm connector between the open and closed positions of the valve with essentially negligible stretching of the diaphragm or deformation of the orifice, so as to have a negligible effect on flow through the orifice in any position of the diaphragm connector.

ALTERNATIVES

Figure 3:
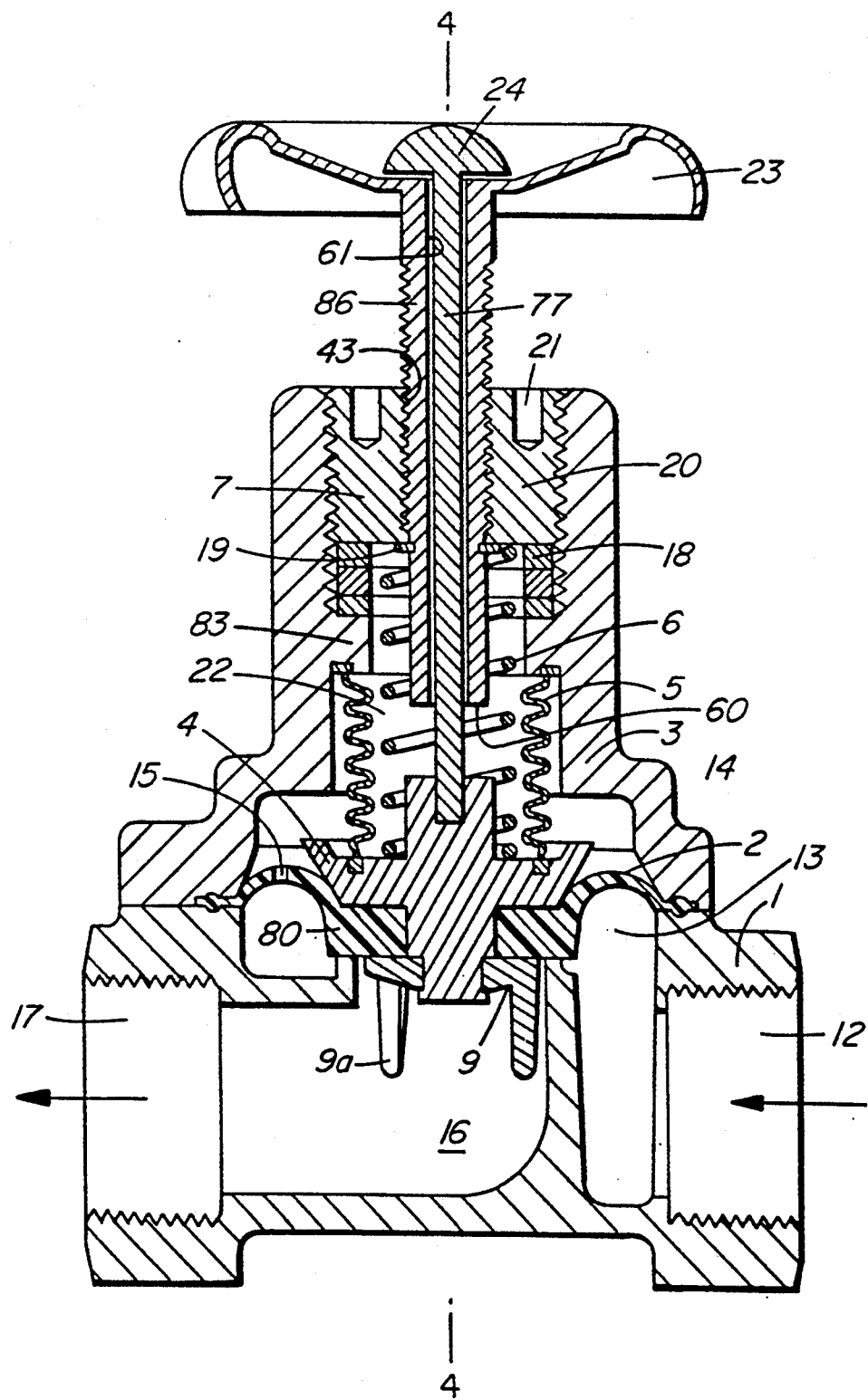
FIG. 3 is a simplified vertical section of a second embodiment of the valve having a manually actuated shut-off and opening provision in an upper casing, and a manually actuated by-pass means provided in a lower casing, the valve being shown closed.
Figure 4:
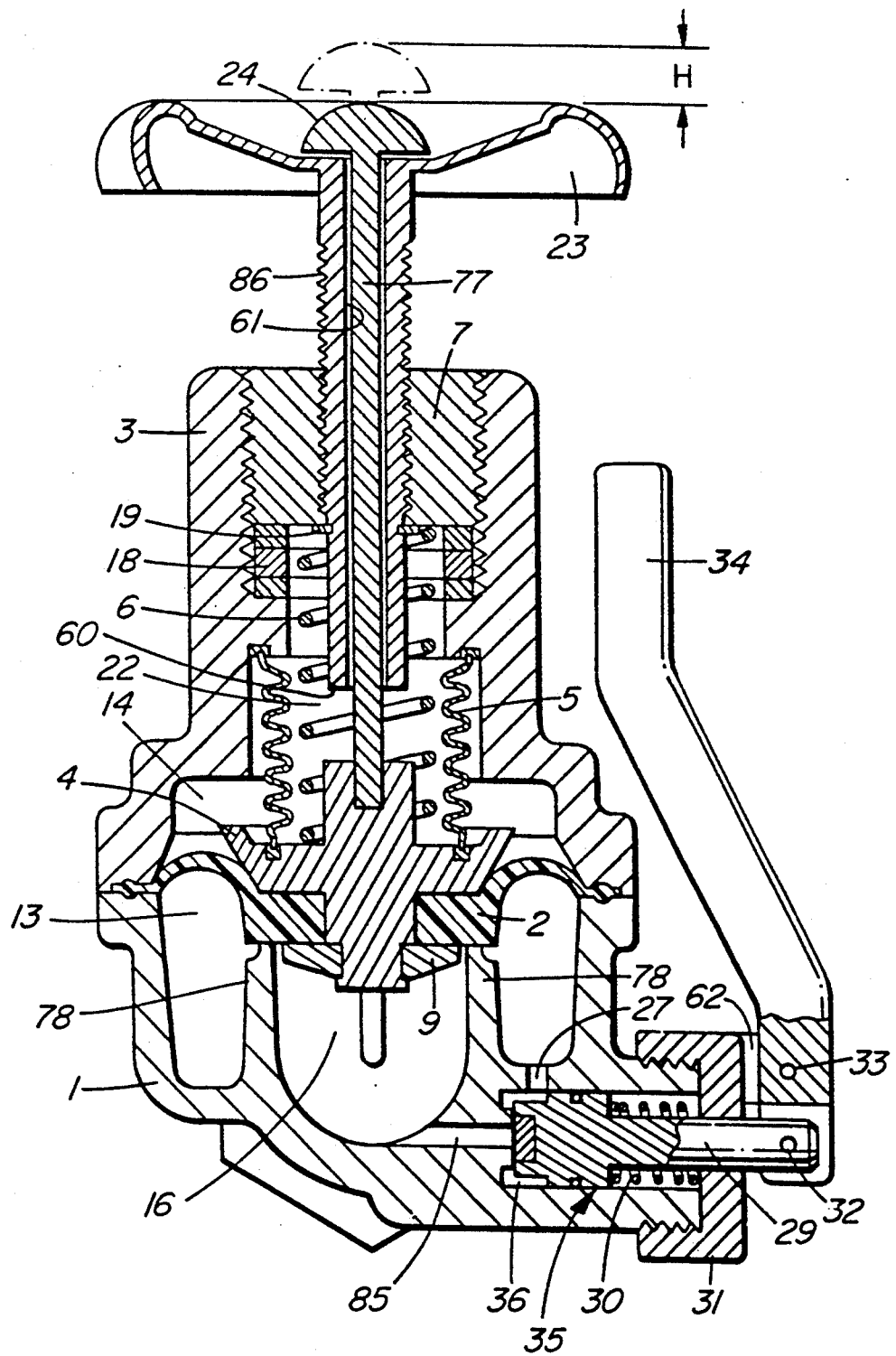
FIG. 4 is a simplified lateral section of the second embodiment of the valve on line 4—4 of FIG. 3.

FIGS. 3 and 4

FIGS. 3 and 4 show a first alternative or second embodiment of the invention which has two additional features from the first embodiment of FIG. 1, and thus has applications in other areas. In particular, the invention shown in FIGS. 3 and 4 is used to control liquid within relatively long pipe networks which have relatively high pressure fluctuations, but otherwise it functions generally similarly to the previously described valve, but has additional features as will be described. Structure in the embodiment of FIGS. 3 and 4 which is equivalent to that embodiment of FIG. 1 is designated identically, although minor structural variations are required. For example, the self-rinsing nozzle 10 is eliminated and the stud 7 fitted in the upper casing 3 has a threaded central bore 43 to receive a threaded elongated valve stem 86. The stem 86 has a handle 23 at an upper and outer end thereof, and an inner end 60 which can be spaced from the valve plate 4 as shown, or can contact the plate when screwed in as will be described. A plurality of calibration spacers 18 are fitted between the inner surface of the stud 7 and the inwardly extending annular part 83 of the casing 3. The calibration spacers limit inwards movement of the stud 7, and thus control spacing between the outer ends of the spring 6, and thus force from the spring into the diaphragm. The stud 7 is rotated by a pair of diametrically spaced apart openings 21, until it bottoms against the calibration spacers 18. A limiter 19, which is an annular member fitted within a complementary recess in the stem 86, limits upwards movements of the valve stem with respect to the stud 7. The valve stem 86 has a central bore 61 which receives a holder 77, having a lower end fixed to the valve plate 4 and is thus generally similar to the handle 11 of FIG. 1. The holder 77 has an indicator 24 at an outer end, disposed outwardly of the handle 23 as shown.

As seen only in FIG. 4, the lower casing 1 has a horizontal conduit 85 extending from the equalizing chamber 16 into a cylindrical valve chamber 36, and a vertical conduit 27 extending from the valve chamber 36 into the pressure chamber 13. The orifice 15 is relatively small when compared with the conduits 27 and 85. When the conduits 27 and 85 communicate with each other through the cylindrical valve chamber 36 they function equivalently to the nozzle 10 to by-pass the valve seat, but in addition are valved to provide controllable communication between the pressure chamber 13 and the equalizing chamber 16. A valve piston member 29 is provided for axial movement within the chamber 30 and is forced to a closed position by a compression spring 30 held in place by a cap 31 screwed into the lower casing 1. The valve piston 29 has an outer end hinged by a pin 32 to an inner end of a control handle 34. The control handle 34 is connected by a hinge pin 33 to a bracket 62 extending from the cap 31, to permit rocking of the handle 34 about the pin 33 to move the piston 29 outwardly against the spring force 30. It can be seen that, when the piston 29 is in the spring-urged closed position as shown in FIG. 4, communication between the conduits 27 and 85 is blocked, thus preventing communication between the pressure chamber 13 and the equalizing chamber 16. When the handle 34 is rotated towards the casing to draw the piston 29 outwardly, communication is established between the conduits 27 and 85, and thus between the chambers 13 and 16. The valve piston 29 and chamber 36 thus provide a manual by-pass channel valve 35.

Operation of the second embodiment of FIGS. 3 and 4 generally follows that of the first embodiment with exceptions as follows. When the liquid supply to the second embodiment of the valve has been re-established after a repair etc., flow from the main valve can manually be re-established by use of the lever 34 as follows. Communication between the chambers 13 and 16 is re-established by by-passing the closed valve seat 78 by rotating the handle 34 to draw the valve piston 29 outwardly, compressing the spring 33 and establishing communication between the channels 27 and 85. Thus, instead of a relatively slow by-pass flow through the self-rinsing nozzle 10 of the first embodiment, a controlled, faster by-pass flow can be attained through the conduits 27 and 85, which permits relatively rapid filling of the pipes downstream from the valve. This permits liquid pressure in the chambers 13 and 16 to be more quickly equalized, resulting in quicker lifting of the valve plate 4 to open the valve seat 78 as previously described. Upwards movement of the valve plate results in corresponding upwards movement of the holder 77 so that the indicator 24 extends a distance H beyond the handle 23, this indicating that the main valve has opened.

The valve can also be used as a manual shut-off valve by rotating the handle 23 so that the valve stem 86 moves inwardly and the inner end 60 thereof contacts the valve plate 4, permitting manual and positive full closure of the valve without automatic intervention. Clearly, when the valve has been manually closed in this manner, it cannot then function as an automatic valve as previously described, until the handle 23 is rotated in a reverse direction, withdrawing the valve stem 86 upwardly until further upwards movement is limited by the contact of the limiter 19 with a lower surface on the stud 7.

In summary, it can be seen that the valve stem 86 has the central bore 61 and is mounted for movement relative to the casing to cooperate with the diaphragm 2. The indicator rod 24 passes through the bore of the valve stem and has the inner end 60 secured to the diaphragm connector, namely the plate 4 and holder 9, and an outer end or indicator 24 extending outwardly of the valve stem so as to indicate position of the diaphragm 2 and to cooperate with the stem for outwards movement therewith when appropriate. It can be seen that the equalizing chamber 16, which is at outlet pressure $P_{i2}$, is disposed between the valve seat 78 and the outlet port 17, and the conduits or 27 and 85 serve as second by-pass channel means extending from the equalizing chamber 16 to the pressure chamber 13 and function equivalently to first by-pass channel means, i.e. the nozzle 10. A valve member, such as the piston 29, serves as a channel valve member and cooperates with the conduits 27 and 85 to open or close the second channel means as required, thus controlling flow between the pressure chamber 13 and the equalizing chamber 16. As seen in FIG. 4, a resilient means, such as a spring 30, cooperates with the valve member or piston 29 so as to urge the valve member 29 to a normally closed position, thus closing the conduits or channel means 27 and 85. The manually actuated handle means 34 cooperates with the valve member 29 to overcome force from the resilient means or spring 30 so as to connect the channel means 27 and 85.

The second embodiment of the valve is appropriate for use in residential installations where operators are not fully aware of improper use of equipment. Sometimes, when there has been loss of water supply, operators can cause further damage by improper actions as follows. After the water flow stops in the pipe network, some of the taps are left open and some of the users leave their hand-held shower head units immersed in water in filled-up bath-tubs, expecting the water supply to return. In such cases, the water supply system acts as a water pipe and sucks in the dirty water with air from the bath-tub. This causes water pollution and hydraulic hammer, because of the air sucked-in through the shower heads. The control valve shown on FIG. 3 and FIG. 4 now acts as a vacuum valve. Thus, the valve has the capacity controller characteristics, it protects from flow ceasing or pipe fracture, and it can be used as a shut-off valve or a vacuum valve.

Figure 5A:
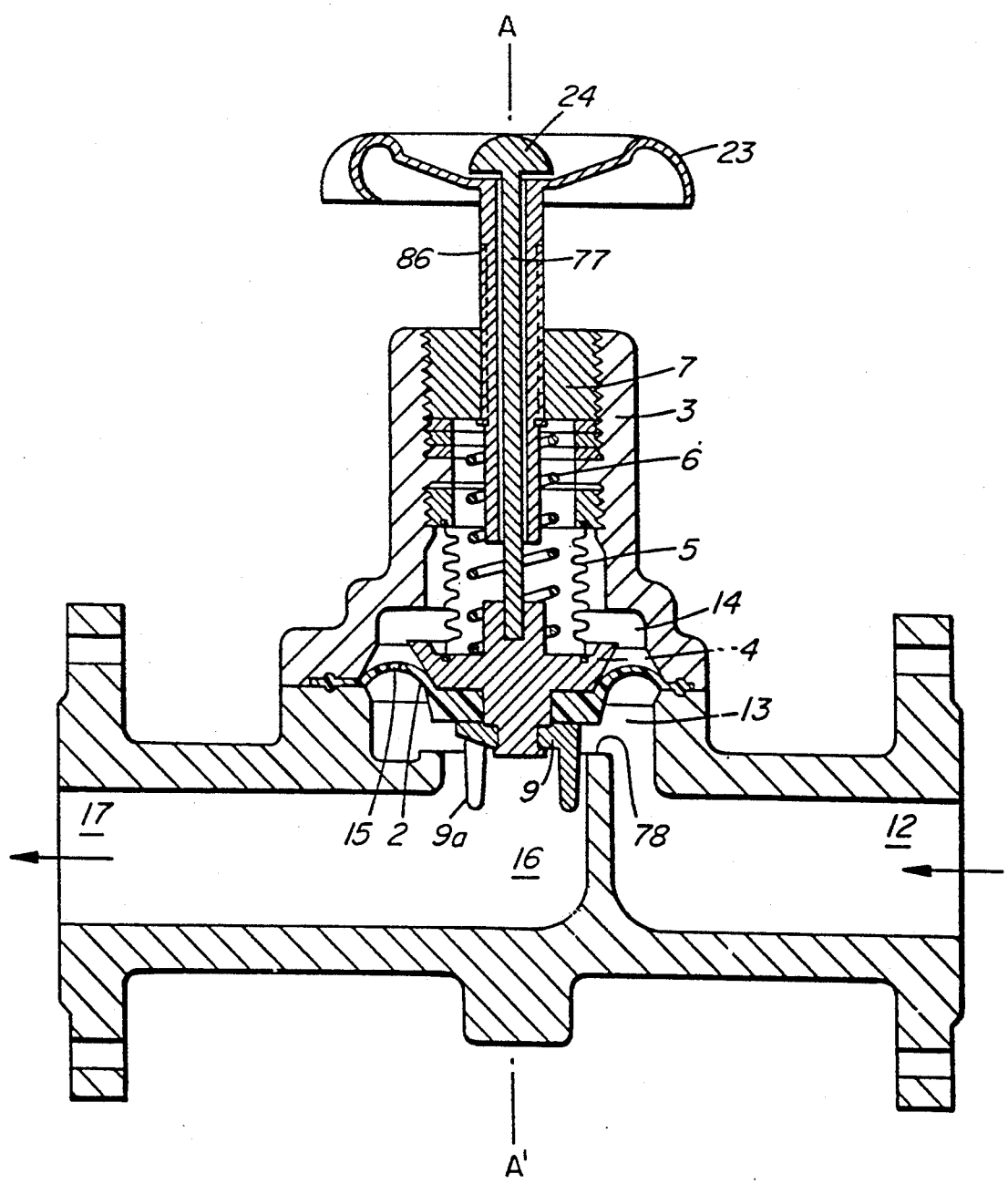
FIG. 5a is a simplified vertical section of a third embodiment of the valve, shown open, having a manually actuated shut-off and opening provision as in FIGS. 3 and 4, with a by-pass means remotely activated by a solenoid.
Figure 5B:
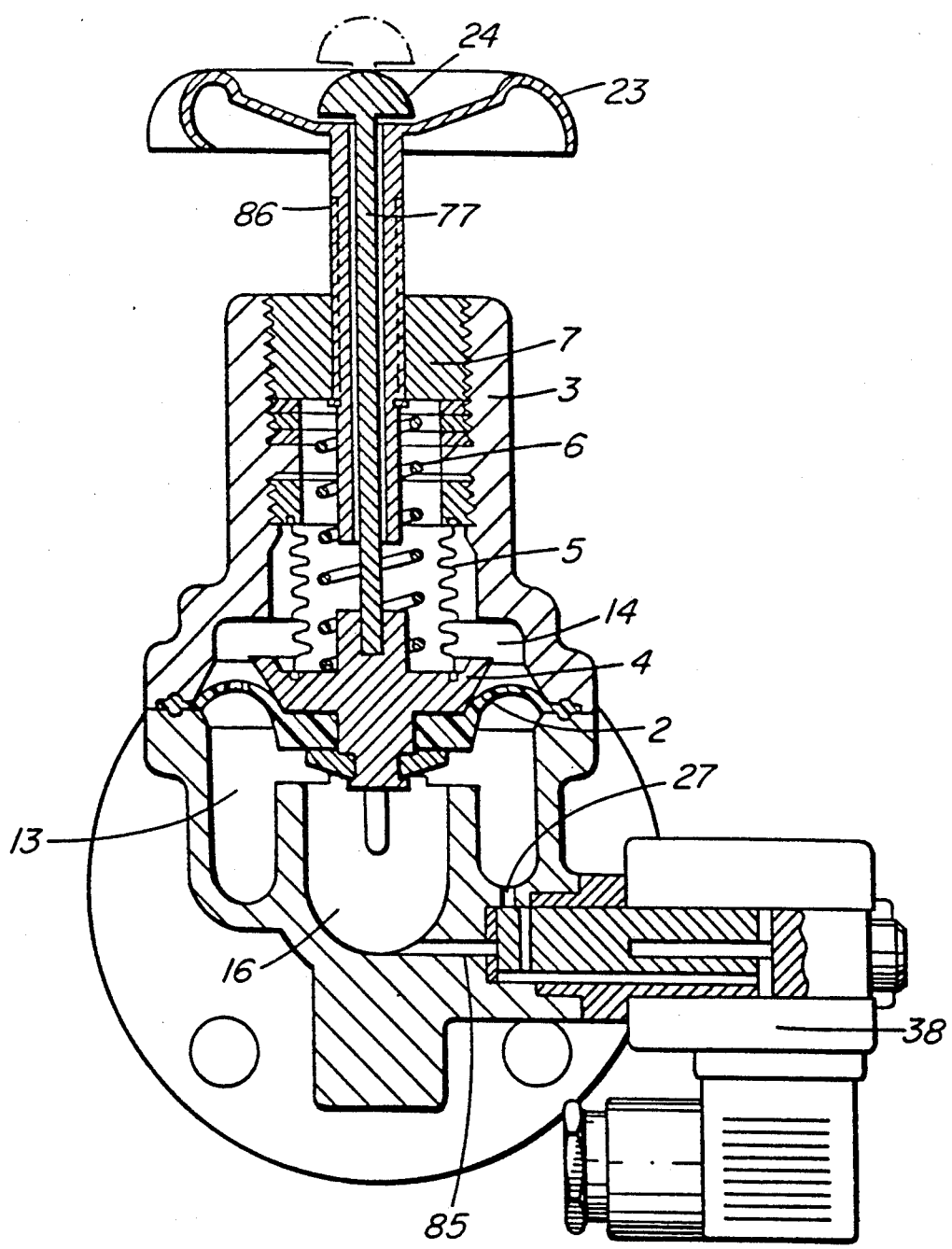
FIG. 5b is a simplified vertical section of a third embodiment on line A—A' of FIG. 5a, FIG. 6 is a simplified vertical section of a fourth embodiment of the valve with a solenoid valve mounted in an upper casing for remotely controlling an alternate by-pass structure, the valve being shown open.

FIGS. 5a and 5b

A third embodiment of the invention is particularly for use in controlling liquid flows in complex industrial pipe networks, where there could be many valves which require by-passing which is best performed by remote operation, in conjunction with the remote control indicator panel, if needed, showing status of particular control valves. The third embodiment of the valve of FIGS. 5a and 5b is generally similar to the second embodiment of FIGS. 3 and 4, with the exception that the manually actuated valve or piston 29 has been substituted by remote electrical actuation using a solenoid valve 38 which controls flow through the horizontal conduit or channel means 85 and the vertical conduit or channel means 27. In FIG. 5b it can be seen that the solenoid valve 38 is a two-way, two-position, normally-closed by-pass channel valve which controls liquid communication between the equalizing chamber 16 and the pressure chamber 13, and thus is equivalent to the manually operated valve with the piston 29 in FIG. 4. Clearly the conduits 27 and 85 function as second by-pass channel means as in FIGS. 3 and 4.

In industrial applications where skilled operators control the valves, it is appropriate to manually open the control valve after a broken pipe has been repaired by manually unscrewing the handle, which, through the holder 77, simultaneously draws the diaphragm and valve plate off the seat 78 so as to open the control valve. Clearly, if the handle 23 remains in the raised position, in which the indicator 24 does not project beyond the handle 23, the control valve could no longer actuate automatically to close the valve if there was a drop in outlet pressure. Consequently, to ensure normal use of the valve after opening, the handle 23 must be screwed inwardly again to a position which is sufficient to permit the valve to close automatically upon reduction of outlet pressure and would be clearly indicated by the indicator 24 projecting beyond the handle 23. If this valve is used in a domestic situation where improper use can cause problems later, it is preferred that the valve is not opened by rotating the handle 23 as described above. Instead, to avoid future possible problems when the pipe has been repaired, the valve should be opened automatically and remotely by actuation of the valve 38 to open the control valve, and to permit liquid to flow once again into the pipe, through the conduits 27 and 85, thus bypassing the closed diaphragm. Clearly, when the downstream pipe is filled, outlet pressure $P_{iz}$ will act upon the diaphragm to open the control valve as needed.

FIG. 6

A fourth embodiment of the invention differs from the earlier embodiments by providing direct, valve controlled communication in the upper casing 3 between the control chamber 14 and the equalizing chamber 16. The diaphragm 2, the bellows 5, the valve plate 4 and the spring 6 are similarly designated and remain the same as before, but the pulling rod 11 of FIG. 1, or valve stem 86 or holder 77 of FIGS. 3–5b cooperating with the valve plate have been eliminated. However, these features could be easily added if required to facilitate opening the valve. Also there is no self-rinsing nozzle 10 or by-pass valve controlled conduits 27 and 85 in the lower casing 1 providing communication between the pressure chamber 13 and the equalizing chamber 16.

The communication between the control chamber 14 and the equalizing chamber 16 is attained by providing in the casing 3 a conduit or channel 46 extending from the control chamber 14 to a solenoid-actuated valve 38.1 located within a cylindrical valve chamber 36.1. The first and second solenoid actuated valves 38 and 38.1 of FIGS. 5b and 6 respectively can be identical. Thus, the valve 38.1 is a two-way, two-position, normally closed by-pass channel valve. The upper casing 3 also has a conduit or channel 45 extending from the chamber 36.1 to communicate directly with a conduit or channel 44 provided in the lower casing 1 and extending into the equalizing chamber 16 or outlet port 17.

Thus, the conduits or channels 44, 45 and 46 extend between the control chamber 14 and the equalizing chamber 16 and flow through these channels is remotely controlled by the solenoid valve 38.1 in a similar manner. The conduits or channels 44, 45 and 46 serve as third by-pass channel means to provide controlled communication between the control chamber 14 and the outlet port 17 when the diaphragm 2 is held against the seat to close the control valve. The orifice 15 is relatively small compared to the conduits 44 through 46.

In order to open the control valve after repair of a pipe fracture, the downstream portion of the pipe must first be filled with liquid as before. This is achieved by raising the diaphragm, which can be done by unscrewing the stud 7 to reduce spring closing force, or by installing the handle 11 etc. to manually and directly open the valve. When the pipe is filled, the valve can be re-set as before by activating solenoid valve 38.1 to be opened. This permits flow of liquid from the chamber 13 through the orifice 15 to the chamber 14, and then through the channels 46, 45, 44 to the chamber 16 to equalize pressure across the diaphragm 2. Thus, the spring and bellows forces acting on the diaphragm are overcome by pressure in the chamber 16, the diaphragm rises and the control valve opens, permitting normal flow of liquid through the valve seat opening. The flow through the orifice 15 in the diaphragm is clearly very much lower than flow through the channel means 46–44 but only a small flow is required to equalize pressure, after which the solenoid valve 38.1 is de-energized. The embodiment of FIG. 6 is appropriate where it is not possible to provide in the lower casing the second channel means 27 and 85 with the valve piston 29 of FIGS. 3 and 4, or the solenoid valve 38 of FIGS. 5a and 5b.

FIG. 7

Figure 6:
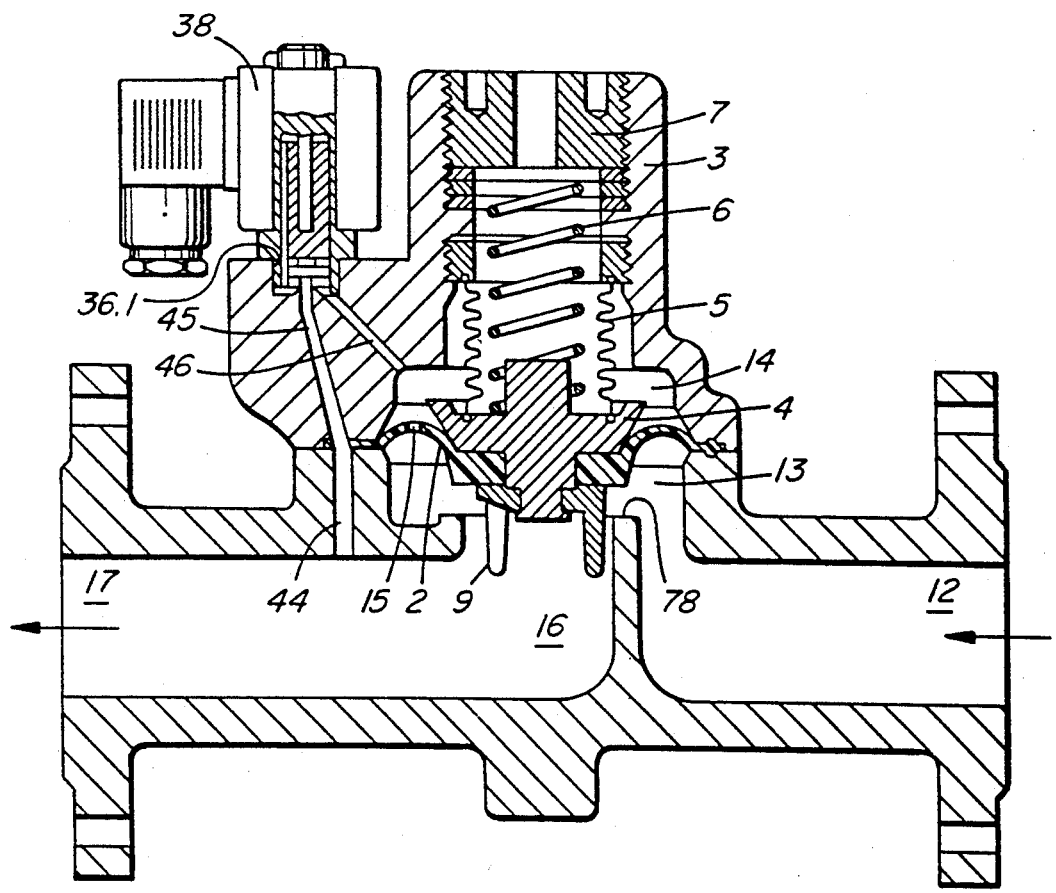
Figure 7:
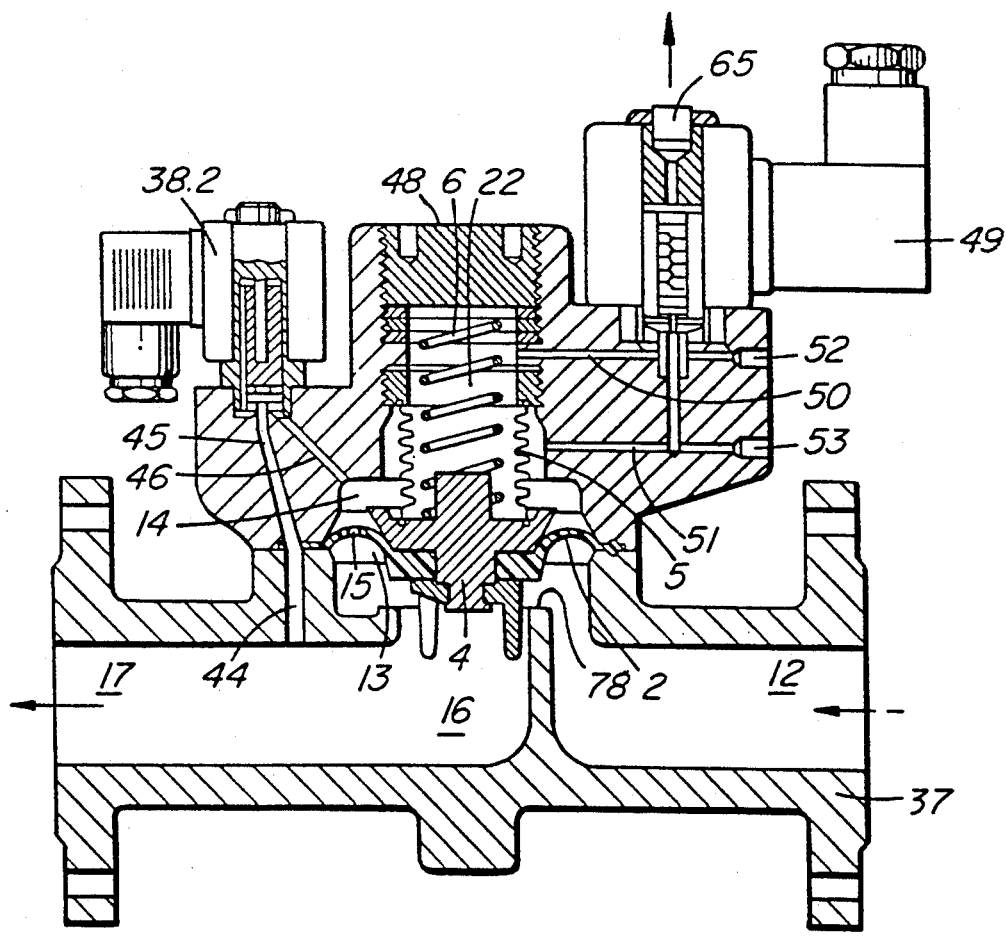
FIG. 7 is a simplified vertical section of a fifth embodiment of the valve with the solenoid valve of FIG. 6, and also shown with an additional remote control solenoid valve for closing the valve.

FIG. 7 shows a fifth embodiment which has many similarities with the fourth embodiment of FIG. 6 and thus is distinguished from the early embodiments by providing no direct communication between the pressure chamber 13 and the outlet port 17 or equalizing chamber 16 when the main valve is closed. Similarly to the FIG. 6 embodiment, the fifth embodiment has the third by-pass channel means, i.e the conduits or channels 44, 45 and 46, which are controlled by a similar second solenoid valve 38.2 to communicate the control chamber 14 with the equalizing chamber 16 as previously described. In addition, the upper casing 3 of the fifth embodiment has two additional conduits or channels 50 and 51 which cooperate with a third solenoid valve 49 which is a two-position, three-way valve. The valve 49 has two ways which, in a first or activated position, can interconnect the channels 50 and 51. When the solenoid valve 49 is de-activated to a second position, the channel 51 is closed, and the channel 50 is connected to a third way, i.e. an outlet 65 which is connected to an atmospheric pressure sump or the equivalent. In contrast with other embodiments, the upper end of the bellows 5 does not communicate directly with atmosphere through the bore 40 in the stud 7 of the previous embodiments. Instead, a substitute stud 48 is sealed, and the second solenoid valve 49 cooperates with the channel means 50 to provide communication to a sump, preferably exposed to atmosphere.

For manufacturing convenience, the channels 50 and 51 pass from an inner side to an outer side of the upper casing 3 where they are blocked by respective plugs 52 and 53. The channel 50 communicates with an upper portion of the casing 3 above the bellows 5, and thus provides access to the bellows chamber 22. The channel 51 extends into the control chamber 14, and thus the control chamber 14 is penetrated by both the channel 46 and the channel 51. The channels 50 and 51 serve as fourth channel means, which when the valve 49 is activated, communicate the control chamber 14 with the bellows chamber 22 for positive closing of the valve. It can be seen that the casing means has the channel means 50 and 51 therein which are disposed so as to provide communication between the bellows chamber 22 within the bellows 5, and the control chamber 14.

The fifth embodiment of the valve is used in industrial applications as a remotely closed valve, depending on the positions of the solenoid control valve 49. As previously described, the solenoid valve 38.2 is a two-way, two-position normally closed valve to control the channel means 44, 45 and 46 to permit liquid to flow from the chamber 13 to the chamber 14, to open the control valve when outlet pressure re-established similarly to FIG. 6.

In contrast, the solenoid valve 49 can be set in one of two positions to close the control valve positively as needed, or to close automatically, as follows. When the channels 44–46 are closed and the solenoid valve 49 is activated to the first position, the channels 50 and 51 are interconnected in such a way that the liquid passes from chamber 13, through the orifice 15 to the chamber 14, and via the channels 50 and 51 into the chamber 22 to expand the bellows, so that the control valve closes under liquid pressure from the chamber 22. Because the chambers 22 and 14 are filled with the liquid from the chamber 13, which liquid must pass through the orifice 15, the control valve closes at a rate determined by flow through the orifice 15. When closed in this condition, the control valve will not open automatically i.e. when the downstream pipe is filled.

When the valve 49 is de-activated to the second position, the channel 51 is closed and the bellows chamber 22 is exposed to atmosphere through the channel 50 and the outlet 65. The control valve still cannot be opened or function as an automatic valve as previously described until the downstream pipe is filled with liquid and the pressure in the chamber 16 is equalized by activating the solenoid valve 38.2 as previously described. When the control valve moves from the closed to the open position, there is a decrease in volume of the bellows, and the displacement of liquid from the bellows passes to the sump through the outlet 65. When the main valve is open and operating normally and the solenoid valve 49 is de-activated, the bellows chamber 22 can contain some residual liquid and is exposed to atmospheric pressure, and the control valve functions as an automatic valve as previously described with reference to FIG. 6.

In summary, the valve 38.2 of FIG. 7 functions in a manner similar to the valve 38.1 of FIG. 6 for opening of the valve by equalizing pressure in the chambers 13 and 16. In addition, the control valve of FIG. 7 can be remotely positively closed by actuating the solenoid valve 49 to an activated position in which the channel means 50 and 51 are connected.

Summary of FIGS. 1–7

In summary, the several embodiments of the invention are described in order of increasing complexity and versatility for many applications. All the valves are designed to be closed automatically when outlet pressure drops, but some embodiments can be opened and/or closed upon demand as follows. The control valve of FIG. 1 is the simplest valve and can only be closed automatically, and if the optional pulling rod 11 is not provided, it can only be opened automatically by drainage of liquid through the nozzle 10 which can be slow. The control valve of FIGS. 3 and 4 is closed automatically, and can be closed manually by screwing the handle 23, and can also be opened manually either by unscrewing the handle 23 or by actuating the manually actuated valve 30 to open the channels 27 and 85. The control valve of FIGS. 5a and 5b can be closed automatically, and closed and opened manually, and also opened remotely by use of the solenoid valve 38. The control valve of FIG. 6 is closed automatically and can be opened remotely by actuation of the solenoid valve 38.2 when the pipe is filled. The control valve of FIG. 7 can operate as an automatic valve as previously described, or similarly can be opened remotely similar to FIG. 6, and in addition can be closed remotely by use of the additional solenoid valve 49.

FIG. 8

Figure 8:
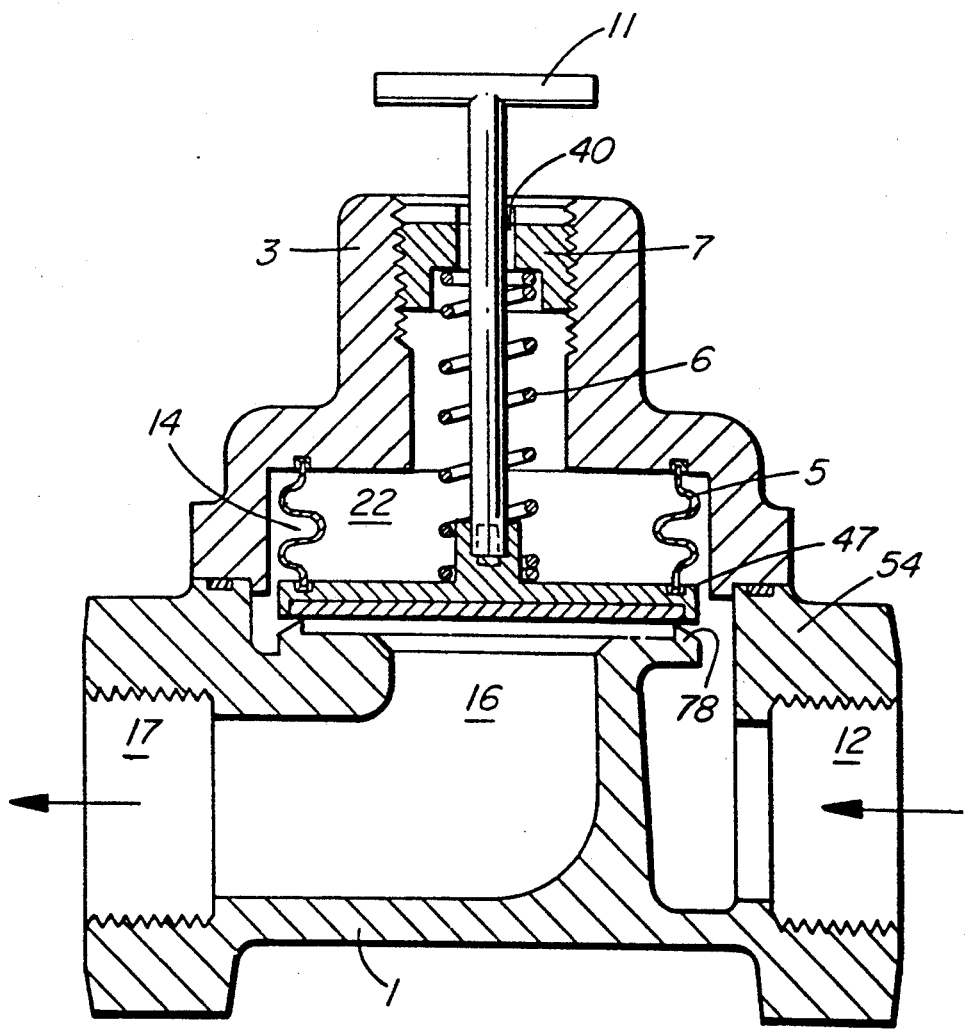
FIG. 8 is a simplified vertical section of a sixth embodiment of a non-diaphragm valve used to control gas flow.

The sixth embodiment of the invention is used only to control gases. The diaphragm 2 has been eliminated, and thus there are no separate control chamber 14, pressure chamber 13, or orifices and channels to permit flow between the chambers. Thus, no conduits, channels or related channel valves are required in the casings 1 and 3. Nevertheless as before, the valve has the valve seat 78 in the lower casing 1 controlled by a valve plate 47 having an upper portion isolated by the bellows 5 defining the bellow chamber. A pulling rod 11 extends from the valve plate 47 through the bore 40 the stud 7 with a spring 6 enclosing the rod as before. The functioning principle remains the same as with the previously described embodiments, except that the pulling rod 11 is used for valve reactivating. Because the control valve of FIG. 8 is for use with gas, hydraulic hammer is not a problem, but valve stability is improved using some principles of the previous embodiments. The main similarity between the control valve of FIG. 8 and the previous valves is that the surface area $A_s$ defined by seat 78 on a lower side of the plate 47 (which is exposed to outlet pressure in the equalizing chamber 16), is essentially equal to an upper area $A_{cf}$ of the plate 47 (which is exposed to atmospheric pressure within the bellows 5). It is noted that this valve can only be opened by the pulling rod 11, and closes promptly as soon as the pressure differential across the plate 47 is unbalanced. This occurs when the upwards force acting on the plate due to outlet pressure is insufficient to resist downwards force acting on the plate due to the atmospheric pressure in the bellows chamber 22, force from the spring 6, and compressive resilience in the bellows 5 as previously described.

I claim:

1. A control valve comprising:
   (a) casing means having an inlet port, an outlet port and an opening having a nominal opening area bordered by a valve seat and being disposed between the inlet and outlet ports to provide communication therebetween,
   (b) a flexible diaphragm secured to the casing means to define, together with the casing means, a control chamber and a pressure chamber on opposite sides of the diaphragm, the diaphragm being movable between an open position clear of the valve seat and a closed position against the valve seat, the valve seat being within the pressure chamber, the diaphragm having an orifice to provide limited communication between the control chamber and the pressure chamber, the orifice having a size sufficient to reduce fluid flow between the control chamber and the pressure chamber so as to reduce speed of the diaphragm when opening or closing the valve to reduce chances of hydraulic hammer,
   (c) a resilient means for urging the diaphragm to the closed position thereof,
   (d) a flexible bellows extending between the diaphragm and the casing means and being located within the control chamber on a side of the diaphragm remote from the valve seat, the bellows being sealed at opposite ends thereof with respect to the diaphragm and the casing means to provide a bellows chamber isolated from the control chamber, the bellows chamber having an effective bellows area defined by a closed envelope passing approximately midway between inner and outer convolutions of the bellows and enclosing an effective area of the diaphragm generally equal to size of the nominal opening area bordered by the valve seat, so as to isolate a portion of the diaphragm enclosed by the bellows from pressure within the control chamber,
   (e) the casing means having channel means for communicating one of the said chambers on one side of the diaphragm with the outlet port when the diaphragm is held against the valve seat to close the valve.

2. A control valve as claimed in claim 1, further comprising:
   (a) s rod having an inner end cooperating with the diaphragm and an outer end having a handle means, the rod cooperating with the casing means to move the diaphragm relative to the seat,
   (b) the resilient means extending between the casing means and the diaphragm to urge the diaphragm against the valve seat.

3. A control valve as claimed in claim 1, further comprising:
   (a) a valve stem having a central bore and being mounted for movement relative to the casing to cooperate with the diaphragm to close the valve,
   (a) an indicator passing along the bore of the valve stem and having an inner end secured to the diaphragm and an outer end extending outwardly of the valve stem, so as to indicate position of the diaphragm.

4. A control valve as claimed in claim 1, in which:
   (a) the bellows chamber within the bellows is exposed to atmospheric pressure.

5. A control valve as claimed in claim 1, in which:
   (a) an equalizing chamber is disposed between the valve seat and the outlet port, the channel means communicating with the equalizing chamber,
   (b) the channel means is a self-draining orifice extending between the pressure chamber and the equalizing chamber.

6. A control valve as claimed in claim 1, further comprising:
   (a) an equalizing chamber disposed between the valve seat and the outlet port, the channel means communicating with the equalizing chamber,
   (b) a channel valve member cooperating with the channel means to open and close the channel means as required.

7. A control valve as claimed in claim 6, in which:
   (a) the channel means extends between the pressure chamber and the equalizing chamber to provide communication between the pressure chamber and outlet port when the diaphragm is held against the valve seat to close the valve,
   (b) a manually actuated handle cooperates with the channel valve member to move the valve member between open and closed positions, thus opening and closing the channel means as required.

8. A control valve as claimed in claim 6, further comprising:
   (a) an electrical actuator cooperating with the channel valve member so as to move the channel valve member between open and closed positions, thus opening and closing the channel means as required.

9. A control valve as claimed in claim 6, in which:
   (a) the channel means extends between the control chamber and the equalizing chamber to provide communication between the control chamber and the outlet port when the diaphragm is held against the valve seat to close the valve,
   (b) an electrical actuator cooperates with the channel valve member so as to move the channel valve member between open and closed positions to open and close the second channel means as required.

10. A control valve as claimed in claim 6, further comprising:
    (a) an additional channel means to provide communication between the bellows chamber within the bellows and the control chamber,
    (b) a channel valve cooperating with the additional channel means so as to open and close the channel means as required to permit the bellows chamber to be exposed to the control chamber or to atmosphere.

11. A control valve as claimed in claim 10, in which:
    (a) the channel valve cooperating with the additional channel means is a three-way, two-position valve, the valve having one way connected to atmosphere, and the remaining two ways connected to the third channel means.

12. A control valve as claimed in claim 1 in which:
    (a) the orifice in the diaphragm is positioned to be clear of obstructions so as to provide generally equally restricted flow therethrough in either direction between the control chamber and the pressure chamber.

13. A control valve as claimed in claim 1 in which:
    (a) the diaphragm has a shape to accommodate movement of the diaphragm between open and closed positions of the valve with essentially negligible deformation of the orifice, so as to have a negligible effect on flow through the orifice in any position of the diaphragm.

* * * * *